Sept. 4, 1956 J. F. VALVO 2,761,654
CIRCUMFERENTIAL SEAL FOR ROTARY PREHEATER
UTILIZING SCREEN MOUNTING
Filed Jan. 14, 1953

INVENTOR.
Joseph F. Valvo
BY
ATTORNEY

United States Patent Office 2,761,654
Patented Sept. 4, 1956

2,761,654
CIRCUMFERENTIAL SEAL FOR ROTARY PRE-HEATER UTILIZING SCREEN MOUNTING

Joseph Francis Valvo, Wellsville, N. Y., assignor to The Air Preheater Corporation, New York, N. Y.

Application January 14, 1953, Serial No. 331,193

6 Claims. (Cl. 257—6)

The present invention relates to heat exchange apparatus and particularly to improved circumferential seals for use between a rotor and the enclosing housing of a rotary regenerative air preheater.

In a rotary regenerative preheater, a cylindrical rotor has compartments carrying metallic heat transfer plates which as the rotor turns are first exposed to heating gases and then disposed in an air passage to impart absorbed heat to the air passing therethrough. The rotor is surrounded by a housing having end or sector plates formed with openings to provide for the flow of gas and air. To prevent mingling of the two fluids, the partitions forming rotor compartments are provided with radial seals that wipe against the imperforate portions of the sector plates. In order to preclude by-passing of gas and air around the rotor through the clearance space between the sides of the rotor and the housing without contacting the heat transfer material, it is also customary to provide the rotor with circumferential seals that bear against a stationary part of the housing.

The present invention contemplates an improved circumferential sealing device and will best be understood upon consideration of the following detailed description of an illustrative embodiment thereof when read in conjunction with the accompanying drawings in which.

Figure 1:
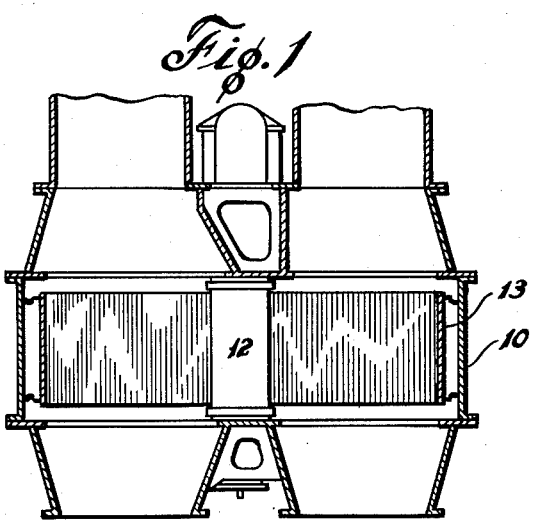
Figure 1 is a diagrammatic representation in elevation of a rotary air preheater which utilizes a circumferential seal of the type herein disclosed.

In the drawings, the numeral 10 designates a cylindrical rotor housing for the rotary air preheater which is enclosed at both ends by ported sector plates 19. Centrally located within the housing is a rotor post 12 supporting a rotor 13 which is divided into sector shaped compartments by partitions 14 extending radially outward from the rotor post. The rotor is turned on its axis by a motor connected thereto through a suitable reduction gearing arrangement not shown. Each rotor compartment contains regenerative heat transfer material in the form of metallic plates which first absorb heat from the hot gases entering the preheater, and then as the rotor turns slowly about its axis, the heated plates 15 are moved into a stream of cold air admitted in counter-current relation to the hot gas flowing through the rotor. After passing over the plates and absorbing heat therefrom, the stream of warmed air is conveyed to a combustion chamber or other point of usage. In order that the streams of gas and air may not by-pass the heat transfer surface by flowing through the annular clearance space 17 between the rotor shell and the rotor housing, a circumferential seal is customarily provided in this space between said members.

Figure 2:
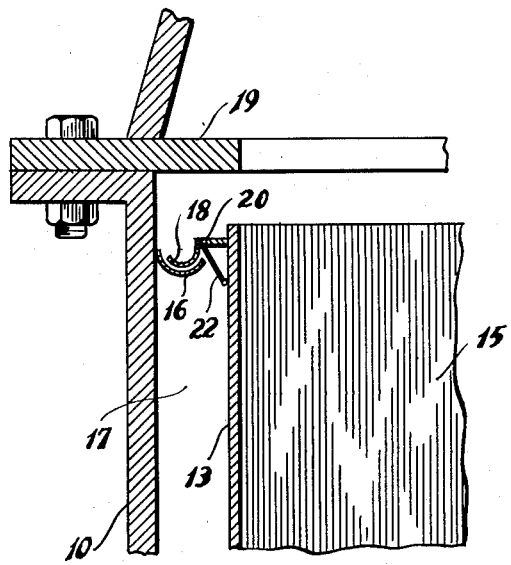
Figure 2 is a detailed sectional view on an enlarged scale of the circumferential seal shown in Figure 1.
Figure 3:
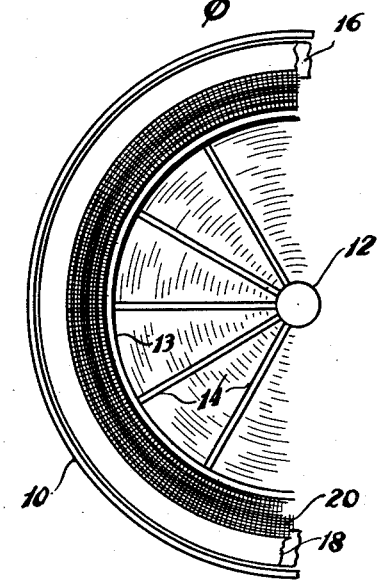
Figure 3 is a partial plan view, partly in section, showing the novel circumferential seal of the invention.

In accordance with the present invention, as illustrated in Figure 2, the rotor housing has attached to its inner circumferential surface a rigid annular cup member 16 having a semi-circular cross section. Resting within said cup member is a similar rigid inner cup member 18 connected at its radial inner edge to an annular member 20. The annular member 20 preferably comprises a flexible wire mesh having a plurality of tightly woven layers which produce in effect a labyrinth seal. Some leakage occurs through each metal cloth diaphragm, but the close knit of this material will create a high pressure drop across it, limiting this leakage. The metal mesh therefore comprises an effective seal and at the same time provides a flexible coupling permitting relative radial and axial movement between the inner cup member 18 and the circumferential edge of the rotor to which the annular member 20 is connected.

Pivoted drive rods or stiffeners 22 may be attached outwardly from points adjacent an end of the rotor to the outer edge of the annular metal mesh. These stiffeners remove excessive strain from the annular member 20 as the inner cup member 18 rotates and is frictionally retarded by the outer cup member 16. However, the members 22 may be entirely omitted if the annular member 20 is formed from a metal mesh having such stiffness that the drag of the inner cup 18 moving within the cup 16 will not cause said annular metal mesh to wrinkle or buckle.

The entire sealing assembly may be satisfactorily located axially at any point on the periphery of the rotor, but it is usually located adjacent either one or both ends of the rotor so as to be readily accessible for removal or repair.

What I claim is:
1. A circumferential seal for use in apparatus having a rotor including passages for a heating gas and air or other gaseous fluid to be heated, a cylindrical shell joined to a rotor post by radial partitions forming compartments that carry heat transfer material and a housing surrounding the rotor and provided opposite the ends of the latter with sector plates formed with apertures for the flow of heating gases and air to and through the rotor; an improved sealing device comprising; a rigid outer sealing ring; a flexible annular member concentrically mounted within and radially spaced from the rigid sealing ring; and a rigid inner sealing ring joined to the peripheral edge of the annular member, said inner sealing ring seating within the outer rigid ring so as to make frictional contact therewith and produce a substantially fluid tight seal.

2. Circumferential sealing means as recited in claim 1 wherein both said rigid sealing rings comprise annular members having a semi-circular cross section.

3. Circumferential sealing means as recited in claim 1 wherein the flexible annular member comprises a plurality of layers of fine meshed metal fabric.

4. Circumferential sealing means as recited in claim 1 wherein the outer edge of the annular member is supported by rods pivotally connected to said rotor shell.

5. An improved circumferential sealing means for a rotary air preheater or the like, said sealing means comprising a fixed annular sealing member; a rotatable annular sealing member concentrically aligned within and radially extending to overlap said fixed annular member, and one of said annular sealing members having a portion comprising a plurality of layers of the fine meshed metal fabric.

6. A circumferential sealing means as recited in claim 5, wherein the fixed member is formed as an annular trough to receive a conforming portion of said rotatable member.

References Cited in the file of this patent
UNITED STATES PATENTS

| | | |
|---|---|---|
| 1,689,735 | Losel | Oct. 30, 1928 |
| 2,245,281 | Klopak | June 10, 1941 |
| 2,250,863 | Goodloe | July 29, 1941 |
| 2,455,539 | Wahl | Dec. 7, 1948 |
| 2,517,512 | Tigges et al. | Aug. 1, 1950 |
| 2,549,656 | Yerrick et al. | Apr. 17, 1951 |
| 2,631,870 | Hodson | Mar. 17, 1953 |